United States Patent
Aebersold

(10) Patent No.: US 7,081,599 B2
(45) Date of Patent: Jul. 25, 2006

(54) APPARATUS AND METHOD FOR PROCESSING WORKPIECES

(75) Inventor: Hans Aebersold, Birmensdorf (CH)

(73) Assignee: Elpatronic AG, Bergdietikon (CH)

( * ) Notice: Subject to any disclaimer, the term of this patent is extended or adjusted under 35 U.S.C. 154(b) by 17 days.

(21) Appl. No.: 10/398,975

(22) PCT Filed: Oct. 22, 2001

(86) PCT No.: PCT/CH01/00627
§ 371 (c)(1),
(2), (4) Date: Apr. 10, 2003

(87) PCT Pub. No.: WO02/34449
PCT Pub. Date: May 2, 2002

(65) Prior Publication Data
US 2004/0040942 A1 Mar. 4, 2004

(30) Foreign Application Priority Data
Oct. 24, 2000 (CH) ..................... 2083/00

(51) Int. Cl.
B23K 15/00 (2006.01)
B23K 26/08 (2006.01)
B23K 26/28 (2006.01)

(52) U.S. Cl. ................... 219/121.63; 219/121.13; 219/121.78

(58) Field of Classification Search .......... 219/121.6, 219/121.63, 121.64, 121.65, 121.66, 121.67, 219/121.68, 121.69, 121.7, 121.71, 121.72, 219/121.82, 121.85, 121.34
See application file for complete search history.

(56) References Cited

U.S. PATENT DOCUMENTS

| | | | | |
|---|---|---|---|---|
| 4,279,561 A | * | 7/1981 | Schneider et al. | 414/591 |
| 4,300,198 A | * | 11/1981 | Davini | 700/264 |
| 4,417,127 A | * | 11/1983 | Nachev et al. | 219/124.34 |
| 4,419,797 A | * | 12/1983 | Sigloch et al. | 29/26 A |

(Continued)

FOREIGN PATENT DOCUMENTS

| EP | 0262545 | * | 4/1988 |
|---|---|---|---|
| EP | 0 770 445 B1 | | 8/1996 |

OTHER PUBLICATIONS

Copy of International Search Report for PCT/CH01/00627 dated Aug. 2, 2002.

Primary Examiner—Samuel M. Heinrich
(74) Attorney, Agent, or Firm—McCormick, Paulding & Huber, LLP

(57) ABSTRACT

An apparatus for processing workpieces by relative displacement of a plurality of simultaneously operating functional elements in relation to the workpieces being worked on is provided. The present apparatus includes a device for the mounting of the functional elements, characterized in that the device has apparatus for keeping the functional elements constantly in their operative position in relation to their workpiece section presently to be processed on the processing path by altering their position during a relative displacement with any desired change of direction. A method for tracing a processing path is also provided. The method includes tracing a processing path by a plurality of functional units arranged in succession one behind another in the path direction and moved along the path. The functional units are aligned on the path independently of each other by positioning means individually assigned to them.

20 Claims, 7 Drawing Sheets

U.S. PATENT DOCUMENTS

| | | | |
|---|---|---|---|
| 4,436,288 A * | 3/1984 | Kellogg et al. | 266/69 |
| 4,501,950 A * | 2/1985 | Richardson | 219/124.34 |
| 4,571,479 A | 2/1986 | Maeda et al. | 219/124.34 |
| 4,588,872 A | 5/1986 | Bollinger et al. | 219/124.34 |
| 4,599,506 A * | 7/1986 | Burke et al. | 219/130.01 |
| 4,724,301 A * | 2/1988 | Shibata et al. | 219/124.34 |
| 4,794,223 A * | 12/1988 | Barkman et al. | 219/124.34 |
| 4,920,249 A | 4/1990 | McLaughlin et al. | 219/130.21 |
| 5,006,999 A * | 4/1991 | Kuno et al. | 700/253 |
| 5,015,821 A * | 5/1991 | Sartorio et al. | 219/124.34 |
| 5,042,774 A * | 8/1991 | Kakinuma | 248/664 |
| 5,229,571 A * | 7/1993 | Neiheisel | 219/121.63 |
| 5,353,386 A * | 10/1994 | Kasagami et al. | 700/247 |
| 5,877,960 A | 3/1999 | Gross et al. | 364/474.17 |
| 5,961,858 A | 10/1999 | Britnell | 219/121.63 |
| 6,059,092 A * | 5/2000 | Jerue et al. | 198/364 |

* cited by examiner

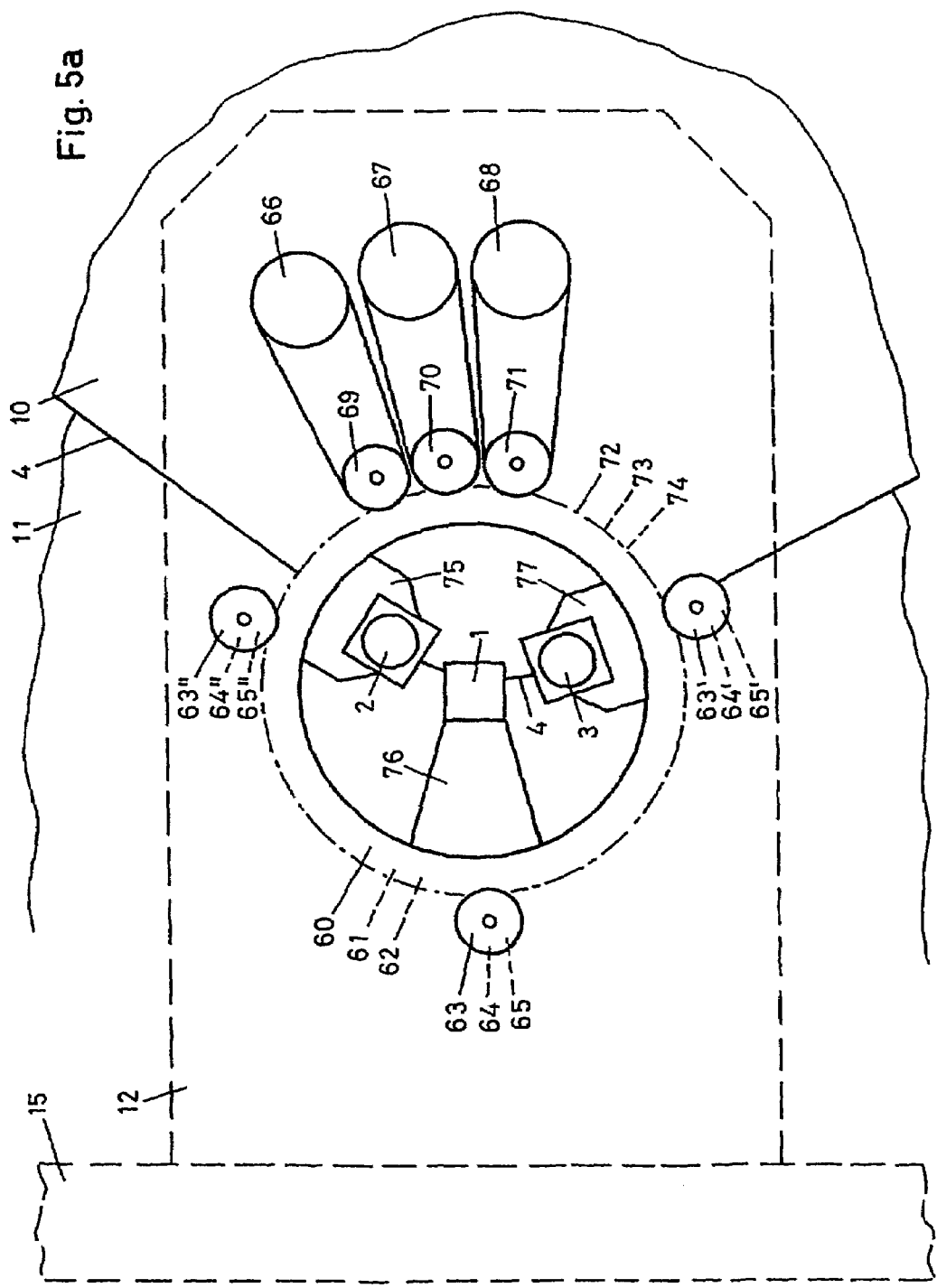

APPARATUS AND METHOD FOR PROCESSING WORKPIECES

Applicants hereby claim foreign priority benefits under 35 U.S.C. § 119 of PCT Patent Application No. PCT/CH01/00627 filed Oct. 22, 2001; Swiss Patent Application No. 2083/00 filed Oct. 24, 2000 and Swiss Patent Application No. 1932/01 filed Oct. 12.2001, the disclosures of which are herein incorporated by reference.

BACKGROUND OF THE INVENTION

1. Technical Field

The invention relates to an apparatus for processing workpieces by relative displacement of a plurality of simultaneously operating functional elements in relation to the workpieces which are being worked on, with a device to hold the functional elements.

2. Background Information

Such apparatuses are known in the field of tailored blanks or in the production of tubes for internal high-pressure forming; and they are also known in other fields.

"Tailored blanks" (Platinen) are metal sheets produced by welding different sheet-metal pieces together. The individual sheet-metal pieces are laid side by side and welded together; e.g., by roller seam welding with the adjacent sheets overlapping, or by laser welding with the sheets butted together.

It is also possible to form tubular parts from different sheet-metal pieces by closing the tube by subsequent welding and by then welding several such tubular pieces together to produce a tube made up of different sheet-metal pieces.

Tailored blanks or tubes of this type have applications; e.g., in the motor-vehicle industry. Tailored blanks for some years; tubes are making their debut. Tailored blanks are deep drawn and formed e.g. into beams for body framework, with defined dissimilar mechanical properties of the beam produced derived from the dissimilar materials or thicknesses of the individual sheet-metal pieces. Tubes are likewise formed into parts for body framework, by internal high-pressure forming (IHU), with the advantage that complicated shapes no longer have to be built up from individual parts, and costly tolerance problems upon assembly disappear.

It is evident from the foregoing that very exacting requirements have to be imposed on the weld seams, since these are already highly stressed by the forming process. It is also evident that no structure-weakening weld flaws possibly leading to defects in the finished product that could have serious consequences can be allowed to occur.

European Patent Publication No. EP 0770445 (hereinafter "EP 0770445" indicates a method and an apparatus for assuring and monitoring the quality of the welding process in the fabrication of inter alia tailored blanks (Reference is hereby expressly made to the total disclosure of EP 0770445). The said document discloses an apparatus for the fabrication of tailored blanks wherein the individual sheet-metal pieces are fixed on a carriage with the welding edges butted together and are led through and under a stationary welding station in a single straight pass. This relative displacement between the carriage (with its straight absolute motion through the apparatus) and the stationary welding station results in a linear processing path on the workpieces.

In principle, individual sheets of any size can be welded together to produce tailored blanks of any desired size. Nowadays, finished tailored blanks can attain dimensions of several meters. For instance, the side-panel of the Jeep Cherokee® is a tailored blank. Lengths of weld seam in the range of a few meters are possible in certain applications.

On the other hand, the effective laser focus has a diameter of 0.2 mm and has to be kept on the processing path with a precision commensurate with this diameter, otherwise weld defects will ensue. Although the mechanics of the apparatus do allow very precise guidance of the carriage through and under the welding station, tolerances are unavoidable. Moreover, further dimensional changes may arise in operation; e.g., due to heating of the laser beam path. Therefore in accordance with EP 0770445 a corrective adjustment is used for the line of the laser beam, the necessary measurements or correction data being obtained by image processing (corrective adjustment of a laser beam is known per se and is effected, e.g., by alterations to the tilt of the mirror in the lasers optical system). According to EP 0770445, the correction data are obtained by detecting the actual position of the edges before the welding point by image processing, and are used to control the lasers optical system. Deviations from the required edge-position of down to a few tenths of a millimeter can be compensated in this way. The weld seam produced then runs along the straight processing path required with a maximum deviation of those few tenths of a millimeter.

But this compensation will work only if the laser beam guide system produces the effective laser focus at the required spot, which is not always the case, owing to, e.g., heating of the beam guide as previously mentioned.

Therefore, another functional element after the welding point detects the actual position of the weld seam, again by image processing. If the weld seam is not at the spot to which the laser focus has been corrected, there is an unpermitted tolerance in the beam guide. Thus, a further correction signal for the laser optical system can be obtained. The result is a control maintaining the correct position of the beam on the straight processing path, thus assuring high weld quality.

Besides the quality assurance afforded by the three functions of (i) first sensor for image processing, (Y) laser optical system and (W) second sensor for image processing, further functions may be critical for the welding process, such as for example a material feed for the welding point (in the form of welding wire or metal powder) known in itself in welding technology. Further or other functions may be adopted as the need arises, such as for example when cutting rather than welding is taking place, as cutting may likewise involve precise guiding of the cutting element (such as a laser, water jet, etc.). Further functions may also arise when workpieces other than tailored blanks are worked with.

In addition to the trend which has been described towards ultra-high requirements in respect of weld quality, increasing use of tailored blanks is also resulting in a growing demand not just for straight welded joints but also for the ability to produce non-linear welded joints—and this for increasingly large production runs. Currently, the stringent requirements that have to be imposed on the welding process are achievable for linear weld seams, but not for seams that are curved or crooked.

It is true that it is known to mount tailored blanks requiring non-linear joints on a carriage and to propel the carriage through the apparatus in the longitudinal direction as the welding station travels to and fro on a transverse bridge; with suitable control of the two motions of carriage and welding station (each in a straight line), processing paths of any desired curvature can be traversed. Such apparatuses work with a single functional element—the focusing head for a laser beam. Hence they fail to realize a welding process of high quality, since other functions, e.g. as disclosed in EP 0770445, are absent.

Hence, the problem of the present invention is to provide an apparatus, which enables several functional elements to be used simultaneously on a curved processing path of an apparatus for processing workpieces.

DISCLOSURE OF THE INVENTION

The problem is solved by the present apparatus for processing workpieces by relative displacement of a plurality of simultaneously operating functional elements in relation to the workpieces being worked on. The present apparatus includes a device for the mounting of the functional elements characterized in that the device has means for keeping the functional elements constantly in their operative position in relation to their workpiece section presently to be processed on the processing path by altering their position during a relative displacement with any desired change of direction.

The problem is also solved by the present method for tracing a processing path by a plurality of functional units arranged in succession one behind another in the path direction and moved along the path, wherein the functional units are aligned on the path independently of each other by positioning means individually assigned to them.

By modifying the position of functional elements, it is possible on the one hand, for elements acting in succession one after the other to be individually kept in their standard position (e.g., vertically over the workpiece surface) on curved sections of the processing path at all times, independently of the absolute motions in the apparatus; but on the other hand, for individual elements also to be deflected from their standard position and thus for radii of curvature to be executed which could not be executed in the standard position because of the dimensions of the elements themselves or, owing to the high accelerations involved, could only be executed at high cost.

For the purposes of the invention it does not matter how the relative motion between the workpieces and the functional elements is produced, whether by functional elements that are fixed in position in combination with a carriage for the workpieces that can be moved in all directions, or vice versa; or by a hybrid solution such as transverse motion of functional elements with respect to the longitudinal motion of the carriage.

DESCRIPTION OF THE DRAWINGS

The invention will now be described in detail with reference to the figures, in which:

FIG. 4b shows a cross-section through the embodiment of FIG. 4a.

FIG. 5a is a view of a further embodiment.

FIG. 5b shows a section through part of the embodiment of FIG. 5a.

FIG. 5c is a side view of the embodiment of FIG. 5a.

DETAILED DESCRIPTION OF THE INVENTION

Figure 1A:
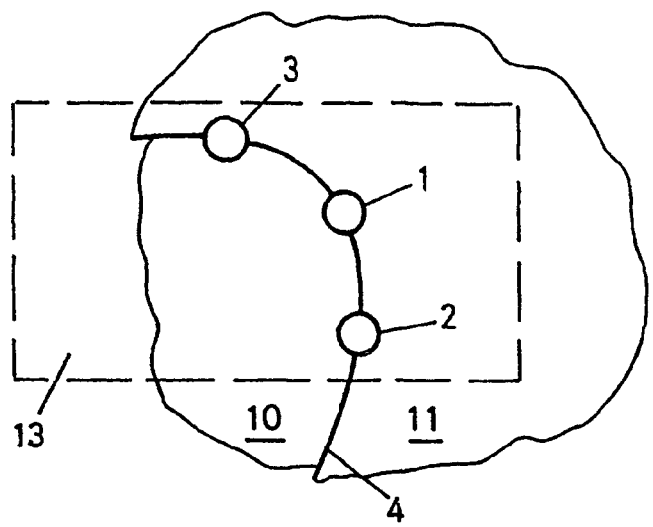
FIGS. 1a to 1c show schematically three functional elements, in each case on a curved processing path with position modified accordingly.

FIG. 1a shows two workpieces 10 and 11, which have been butted together for processing (in this case, welding). The juxtaposed edges of the workpieces form a processing path 4. Three functional units 1, 2 and 3 are arranged in a device 13 for holding the functional units, and are located above the processing path 4 in the operative position to weld the workpieces 10 and 11; e.g., in the manner proposed in EP 0770445. This is performed by a laser beam whose position is controlled with the aid of two sensors for image processing. An energy beam of a different type, such as an electron beam for example, could also be used. The functional unit 1 (a head with a laser optical system) is located between a precursor functional unit 2 and a follower functional unit 3 (both sensors for image processing).

It is evident from the figure that the functional units have modified their position in relation to a straight processing path:

The relative position of the three functional units 1, 2 and 3 alters continually in accordance with the changing curvature of the processing path 12. If only two functional units are operative, they still alter their position in relation to the workpieces 10, 11 (and/or to the device 13 as the case may be) even though the distance between them remains constant.

Figure 1B:
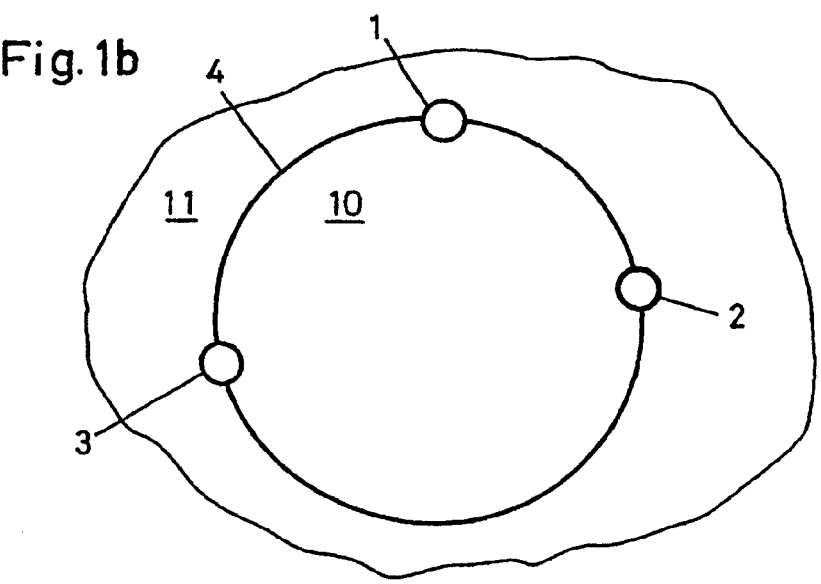

FIG. 1b shows a circular processing path 4. It can be seen from the figure that with the functional units 1, 2 and 3 arranged over the processing path the smallest possible distance between two functional units (here functional units 2 and 3) determines the minimum radius of curvature. Were the circle formed by the processing path 12 smaller than the distance between the units 2 and 3, one of the units could no longer be kept on the processing path 12.

Figure 1C:
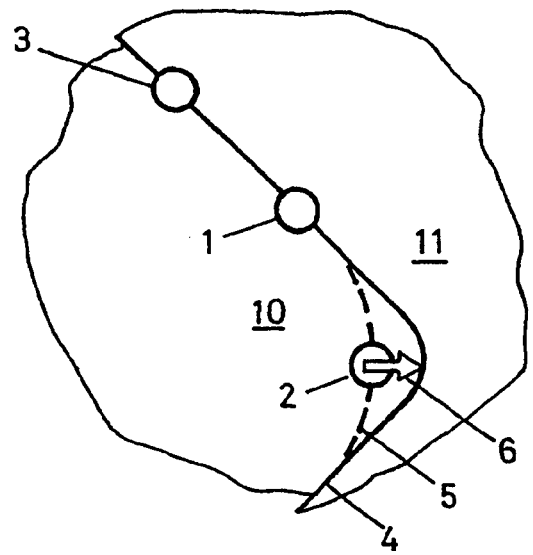

FIG. 1c shows a processing path 4 through a rounded right-angled corner with a very small radius of curvature. If the precursor functional unit 2 deviates sideways from the processing path 4 and stays on the track 5 drawn as a broken line, a simpler movement cycle results. First of all, large accelerations of the unit 2 are prevented, which is in keeping with the need to keep the rate of deposition as uniform as possible, and hence to keep the rate of travel of the functional unit 1 in relation to the processing path 4 as uniform as possible. Then, there is a larger radius of curvature of the track to be followed by the individual functional units, which can be a decisive factor in the case of a processing path 4 with a complex course. The track curve 5 in the figure presupposes that the position of the functional unit 2 can be modified so that it is able to operate on the processing path 4, and thus stay in the operative position, even when laterally offset, as indicated by the arrow 6. This contrasts with the arrangement of FIG. 1a where the functional units 1 to 3 are shown in an arrangement directly over the processing path 4.

Figure 2A:
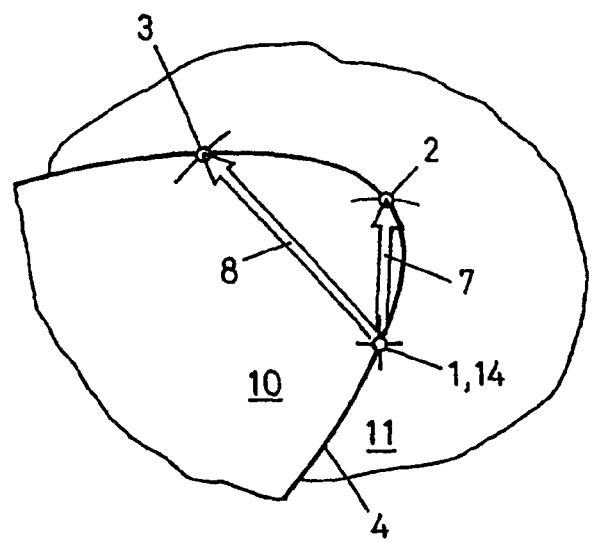
FIGS. 2a to 2c show three functional elements on the processing paths corresponding to FIGS. 1a to 1c, shown with regard to the mutual change in position.

FIG. 2a shows the processing path 4 of two workpieces 10 and 11 and the functional units 1, 2 and 3, the device 13 being omitted so as not to clutter the drawing. A reference point 14 marked with a cross does however denote the position of the device 13 in relation to the workpieces. In this instance this point coincides with the position of the precursor functional unit 1. As indicated in FIG. 2a, the position of the functional units 2 and 3 are defined from the reference point 14: firstly by the shorter vector 7 (distance between units 1 and 2), secondly by the longer vector 8 (distance between units 1 and 3).

Figure 2B:
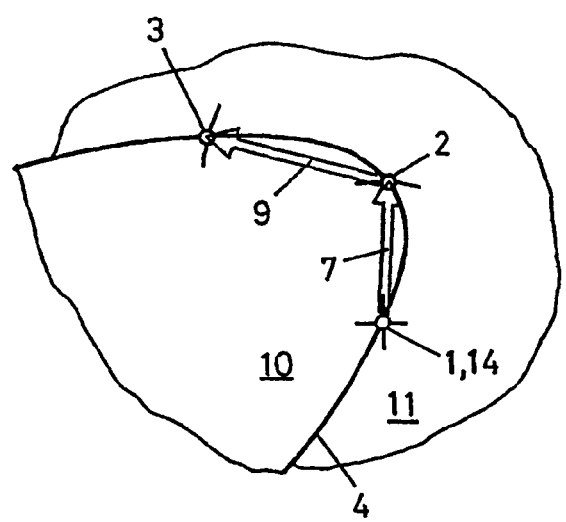

FIG. 2b shows the arrangement of FIG. 2a, with the position of the functional unit 3 in relation to the functional unit 1 (and the reference point 14) defined by the position of the functional unit 2. The sum of the vectors 7 and 9 gives the mutual position of the functional units 1 and 3.

FIG. 2c again shows the arrangement of FIG. 2a, with the functional unit 1 (and the reference point 14) lying between the functional units 2 and 3 whose position is thus defined by the vectors 7 and 9 (distance between units 2 and 3).

Figure 2C:
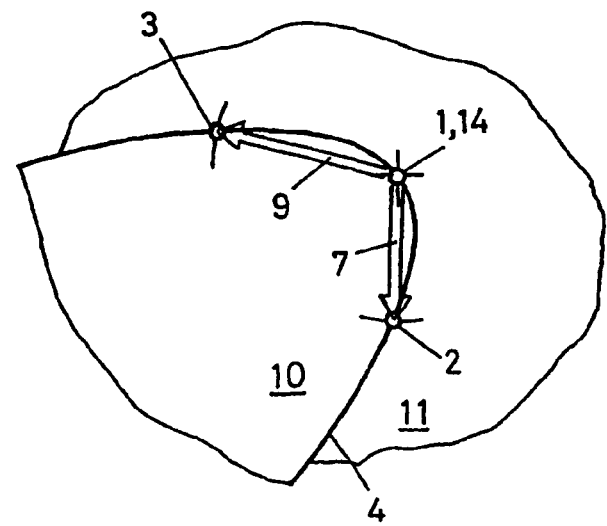

Although all variants in FIGS. 2a to 2c are feasible depending on the purpose for which the apparatus is used, the arrangement of FIG. 2c is especially appropriate. If the reference point 14 (which preferably, though not necessarily, coincides with one of the functional units 1 to 3) is the basis for computation by the control unit of the respective position of the functional units 1 to 3, or for the mechanical traversing of the track curve 4 by holders arranged movably in the vectors 6 to 9, rounding errors, tolerances etc. are inevitable. The effects of angular errors grow larger as the distance between the reference point 14 and the respective functional unit 1, 2 or 3 increases. For this reason, the arrangement of FIG. 2c with the short vectors shown is preferable to the arrangement of FIG. 2a. The arrangement of FIG. 2c is also preferable to that of FIG. 2b, as in the latter the errors between the reference point 14 and the functional unit 3 are cumulative.

Figure 3:
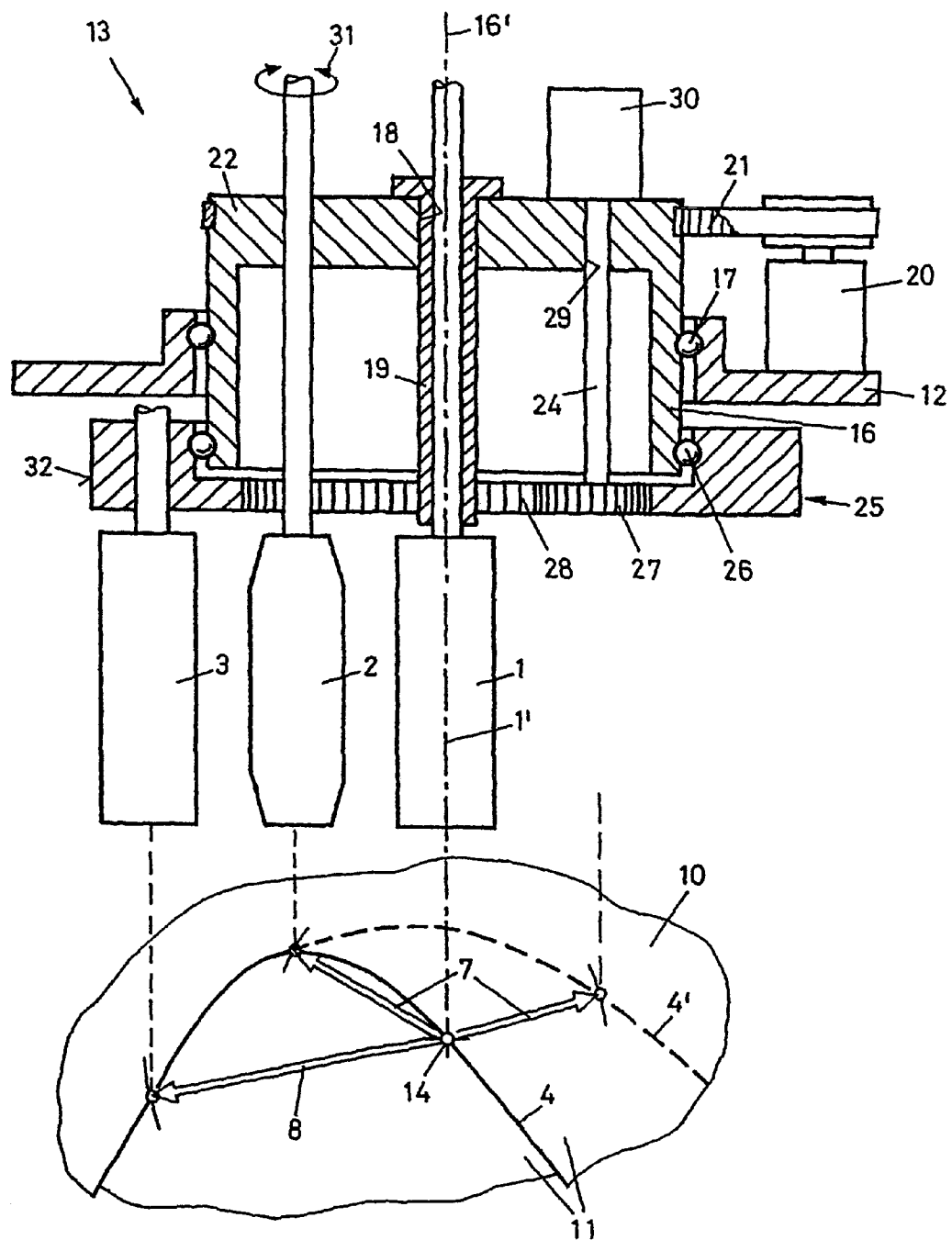
FIG. 3 shows a cross-section through one embodiment of a device for positioning the functional elements.

FIG. 3 shows a cross-section through an embodiment of the device 13 according to the invention with the functional units 1, 2 and 3. The figure also shows schematically a processing path 4/4'. The reference point 14 defines the position of the device 13 in relation to the workpieces 10 and 11, enabling the overriding control of the apparatus to make certain of the predetermined relative displacement by modifying the direction and/or rate of displacement between the workpieces 10, 11 and the device 13.

The functional unit 1 is configured as a sensor for image processing, and detects e.g., the position of the edges of the juxtaposed workpieces 10, 11 in a defined section, now about to be processed, of the path 4. The functional unit 2 is configured as a focusing head for an energy beam, e.g., the beam of a jag laser, and functions as a welding unit to weld the workpieces 10, 11 together. The functional unit 3 in turn is configured as a sensor for image processing, and detects the position and/or quality of the weld seam. EP 0770445 shows a possible way in which these functional units can work together.

Figure 4A:
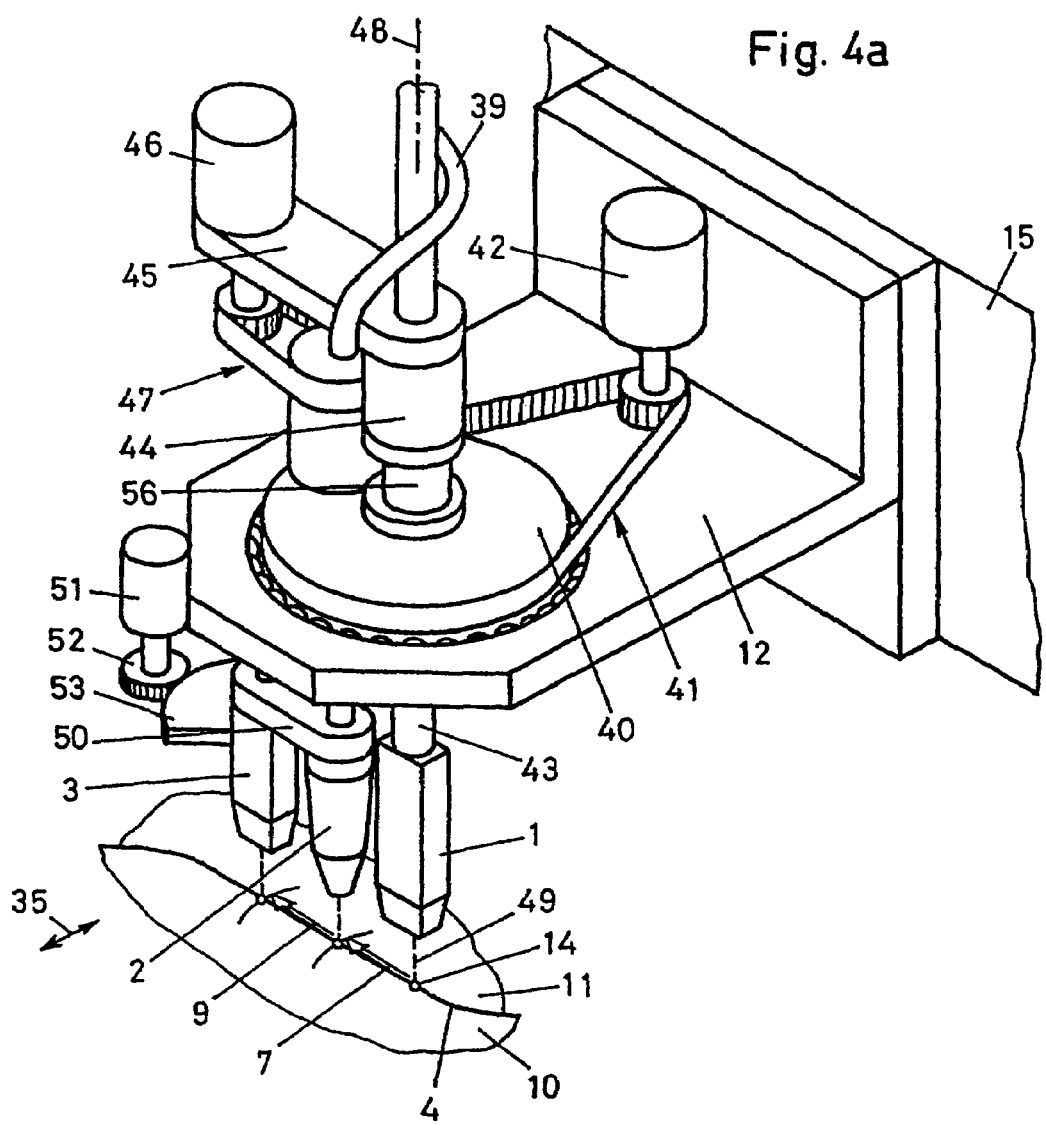
FIG. 4a is a view from above of a further embodiment.

A baseplate 12 forms the base for the arrangement of the functional units 1, 2 and 3 in the device 13, and is preferably arranged displaceably on a bridge 15 (see FIG. 4a). This sets up the arrangement previously described in the apparatus configured in accordance with the invention in which workpieces 10, 11 fixed to a carriage advanced longitudinally and so pass under a device 13 held displaceably in the transverse direction on the bridge 15. However, the invention is not limited to such an arrangement and can be used wherever any kind of relative displacement is created between the workpieces 10, 11 and the device 13.

A holder 16 whose orientation can be varied is arranged on the base 12. It is configured as a body of revolution and has an axis of symmetry 16'. It is mounted rotatably on the base 12 by the schematically indicated ball bearing 17. It has a central opening 18 with an insert 19 enabling the functional element 1, which is fixed in position with respect to the base 12, to retain its orientation independently of any rotation of the holder 16. The axis of symmetry 16' of the holder 16 coincides with the operative line 1' of the functional element 1. The position of the operative line 1' on the processing path constitutes the reference point 14. The position of the base 13 in relation to the workpieces 10, 11 is thus defined, as is the position of the functional element 1 in relation to the workpieces 10, 11.

A motor 20 attached to the base 12 acts via a belt drive 21 on a belt pulley 22 fixedly arranged on the holder 16 so that the holder 16 can be turned in relation to the base 12, thus altering the position of the functional element 2 mounted in the holder 16.

Also arranged on the holder 16 is a ring structure 25, which in turn serves as holder for the functional element 3. The ring structure 25 and holder 16 are connected to each other by a schematically shown ball bearing 26, with the result that the ring 25 can be rotated in relation to the holder 15 (and also, of course, in relation to the base 14). The drive for the ring 25 is provided by a pinion 27 acting on internal toothing 28 on the inner circumference of the ring 25. The pinion 27 is mounted on a shaft 24 which extends through an opening 29 in the holder 16. Shown schematically is a drive 30 mounted on the holder 16 for the shaft 24, by means of which the relative position of the ring 25 in relation to the holder 16 can be altered.

The mounting of the ring 25 on the holder 16 and, in turn, the mounting of the latter on the base 12 are in effect a cascade arrangement, the ring 25 being mounted on the base 12 indirectly through the holder 16.

The processing path 4 and the reference point 14 are indicated in the lower part of the figure. The configuration of the functional units on the processing path 4 corresponds to that of FIG. 2a. However, the configuration of FIG. 2c can be created simply rotating the holder 12. In the figure, this would give the arrangement running on the processing path 4' drawn as a broken line.

The functional element 1 for its part can be mounted rotatably about its own axis on the base 12, for example where for image processing purposes the same defined orientation in relation to the viewed section of the processing path 4 must be maintained at all times. This also applies to the mounting of the functional element 2 on the holder 16, which may be fixed or rotatable. A fixed arrangement is possible if a round laser focus is used for welding the workpieces 10, 11. For an oval focus, a constant, defined orientation of the focus relative to the section of processing path is necessary, hence the functional element 2 will need to be rotatable as indicated by the arrow 31. The corresponding drive has been omitted to avoid unduly encumbering the drawing. What has just been stated in relation to the mounting of the functional elements also applies to the functional element 3. Here again, the corresponding drive (or fixed mounting as the case may be) has been omitted from the figure for the sake of simplicity.

The mounting and rotational drive of the functional elements can be of conventional design and construction and will therefore not be described in detail here.

The pinion 27 co-operating with internal toothing 28 can of course also be arranged on an outer circumference 32 of the ring 25.

FIG. 4a shows a device 13 for mounting functional elements 1, 2 and 3, arranged on a bridge 15. This means that the device 18 is held slidably in the transverse direction with respect to the longitudinal feed of the workpieces 10 and 111 indicated by the doubleheaded arrow 35. A disc-shaped holder 40 is mounted rotatably on the baseplate 12 of the device 13. A motor 42 mounted on the base 12 imparts the required rotation via a belt drive 41. At the center of the holder 40 in turn, and likewise rotatable about its own axis, the functional element 1 is mounted and is thus located in a defined and spatially fixed position in relation to the base 12.

Rotation of the functional element 1 is by means of a shaft 43 driven by a motor 44. The motor 44 is mounted on the base 12, but the corresponding arrangement has been omitted from the drawing in the interest of clarity.

The functional element 2 is also mounted on the holder 40, but not centrally, and so changes its position in relation to the base 12 as the holder 40 rotates. A secondary holder 45 follows the rotation of the holder 40 and carries a drive 46 which in turn, a schematically shown belt drive 47, causes the element 2 to rotate about its own axis.

A further holder 50, which mounts the functional element 3, is arranged on the mounting of the functional element 2. A schematically indicated drive 51 acts via a pinion 52 on a toothed quadrant 53 to rotate the functional element 3 about its own axis. A glass fiber-cable 39 for a jag laser arranged in the element 2 is merely suggested schematically.

The holder 40 is configured as a body of revolution or ring. Its axis of symmetry 48 coincides with the operative line 49 of the functional unit 1. Axis of symmetry 48 and operative line 49 pass through the workpieces at the location of the reference point 14.

The device 13 illustrated in FIG. 4*a* has the configuration of FIG. 2*b*.

Figure 4B:
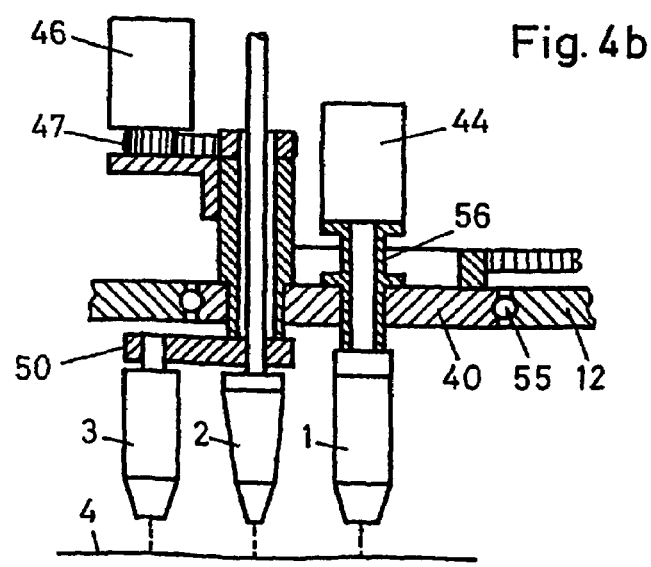

FIG. 4*b* shows part of the arrangement of FIG. 4*a* in cross-section.

The holder 40 is mounted on the base 12 via a schematically shown ball bearing 55. The functional unit 1 is mounted by a bearing element 56 at the centre of the holder 40 so that it does not itself participate in the latter's rotation but is only altered in its position in relation to the base 12 by the drive 44. The sweeping holder 50 is mounted in the holder 40 and undergoes a change in position when the latter rotates. This change in position is also imparted to the functional element 2. The functional element 2 can be rotation about its own axis by the drive 46, 47 shown in FIG. 4*a*. The functional element 3 is mounted on the sweeping holder 50. The drive 52, 53, shown in FIG. 4*a*, for rotating the functional element 3 has been omitted to clarify the figure.

Figure 5B:
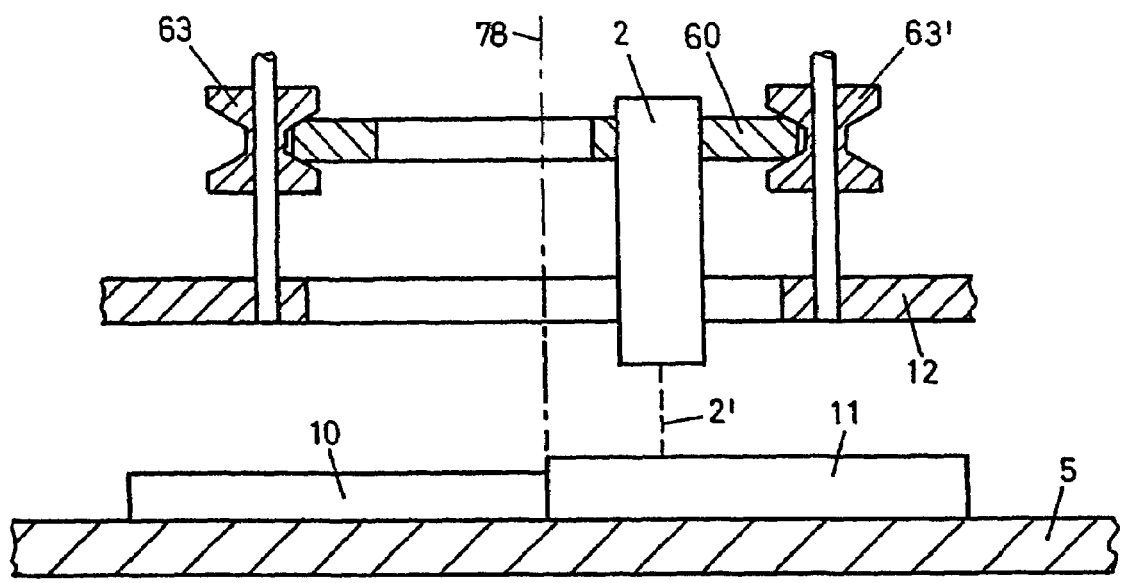

FIG. 5*a* shows a further embodiment of a device 13 for mounting the functional elements 1, 2 and 3. This shows a view from above of the device 13 and the workpieces 10, 11 and processing path 4 underneath. The contour of the base 12 is schematically suggested by the broken outline, as is that of the bridge 15. In the figure, a ring-shaped holder 60 conceals similarly configured holders 61 and 62 arranged beneath it. Thus the holders 60, 61 and 62 are located over the base 12, vertically one above the other, and their axes of symmetry coincide and are perpendicular to the base 12. The holder 60 is mounted on the base via guide rollers 63, 63'and 63" (see FIG. 5*b*). The holders 61 and 62 are mounted via guide rollers 64, 64' and 64" in the same way as the holder 60 is mounted, and as shown in FIG. 5*b*. The rings 60, 61 and 62 are thus arranged rotatably about their axis of symmetry on the base 12. Belt drives 66, 67 and 68 each act upon one of the holders 60, 61 and 62. Pinions 69, 70 and 71 of the drives 66, 67 and 68 act on external toothing 72, 73 and 74 on the corresponding ring 60, 61 and 62. The diameter of the pinion 69, 70, 71 is preferably made small in proportion to the diameter of the rings 60, 61 and 62. With this gear reduction, the rotation of the rings can be very precisely controlled, which can be crucial for proper operation of the functional elements.

The ring 60 has a segment 75, which supports the functional unit 2. The ring 61 has a segment 76 for mounting the functional unit 2, and the ring 62 has a segment 77 for mounting the functional unit 3. The operative line of the functional unit 1 passes through the processing path 4 at the reference point 14, which has been omitted to alleviate the figure.

From the configuration shown in FIG. 5*a* it can be seen that the functional elements 1, 2, and 3 are arranged in the region inside the rings 60, 61 and 62, which means that the distances between them are unaffected by the design of the rings 60, 61 and 62 (apart from their diameter, which can easily be increased if need be). The ring structure also means that guide rollers and drives for the rotation of the rings can be arranged in the outer region with the result that the whole of the inner space is available for the functional elements.

Consequently the structure shown is universally usable for simple and complex processing paths, and for a single functional unit or a larger number of functional units. The minimum distance between the functional units is not governed by the holder structure but solely by the construction of the elements themselves.

Data exchange and power supply to the functional units can be effected via cable or slip rings. Slip rings may be arranged, e.g., on an outer circumference, and have the advantage that the rings can be rotated as desired without having to take cable twisting into account. Wireless data-transmission is of course also feasible.

The configuration of the device 13 shown in FIG. 5*a* corresponds to the arrangement of FIG. 2*c*.

FIG. 5*b* shows a cross-section through the ring 60, the guide rollers 63, 63' (shown opposite one another in the figure) and the base 12. The guide rollers run on the outer circumference of the holder 60, thus supporting it radially. At the same time, axial support is given through the beveled flanks by the matched contact faces of the rollers 63, 63', with a form-fitting connection. The other rings 61 and 62 are omitted to simplify the figure, as are the drives 66, 67 and 68. Also shown schematically are the functional unit 2 with its operative line 2', and the axis of symmetry 78 of the ring 60. The workpieces 10, 11 also appear. The guide rollers 63 are freely rotatably arranged on the schematically shown guide roller holders 64, 64'. These holders 64, 64' are mounted in turn on the base 12. With this configuration, any number of rings can be mounted one above the other on the base 14 by means of the same mounting 64, by arranging a number of guide rollers 63, 64 or 65.

Alternatively, the guide rollers may have toothing co-operating with the external toothing of the rings 60 to 63, with the advantage that separate drives 66 to 68 are no longer necessary.

Figure 5C:
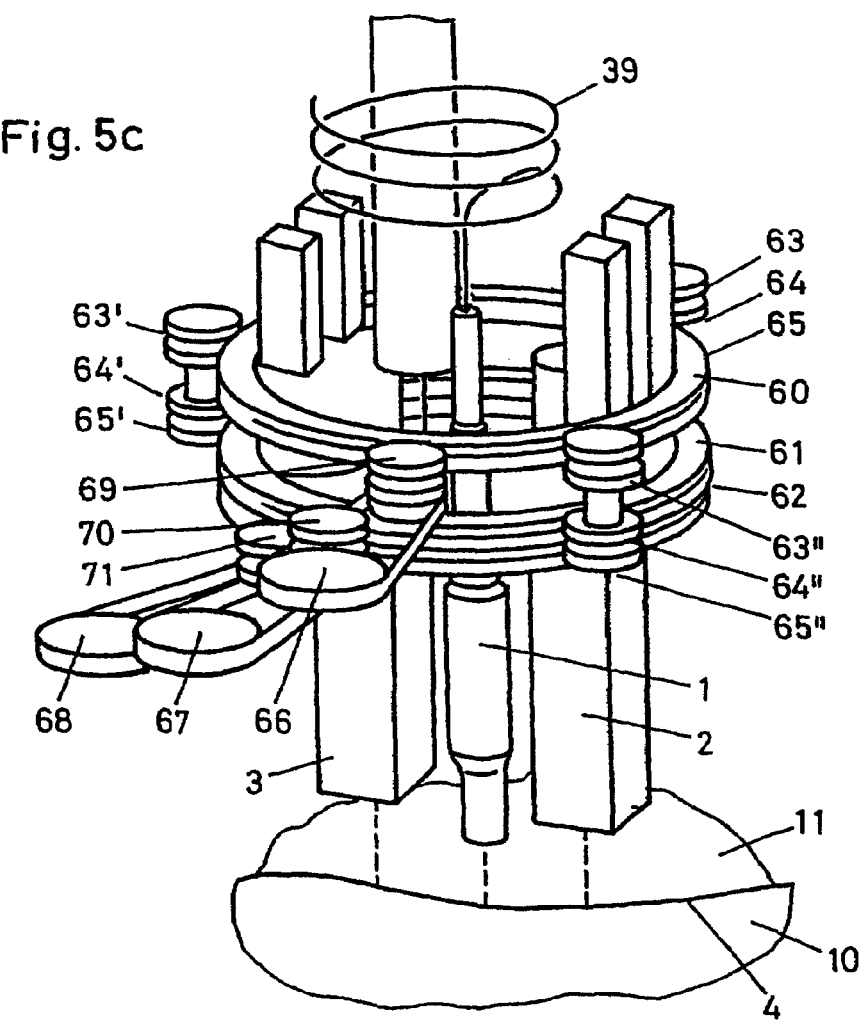

FIG. 5*c* is a side view of the arrangement shown in FIGS. 5*a* and 5*b*. Parts are referred to by the same numbers as before. Bridge 15 and base 12 are omitted, to relieve the drawing.

Further embodiments can be configured as follows:

For example, the arrangement as shown in FIG. 3 with ring 25 omitted so that only two functional elements can be used. The element 2 is arranged as in FIG. 3 without modification, whereas the element 1 is not placed centrally in the holder 16, but offset, like the element 2. When a change in position occurs, the relative situation of the elements 1, 2 is not altered, but their position is. Thus, again, any desired processing path can be traversed as relative movement occurs between the workpieces 10, 11 and the device 13.

For example the arrangement as shown in FIG. 4a, a number of holders 50 being provided, with these holders linked at a common point and preferably having a common sweep axis.

Figure 6:
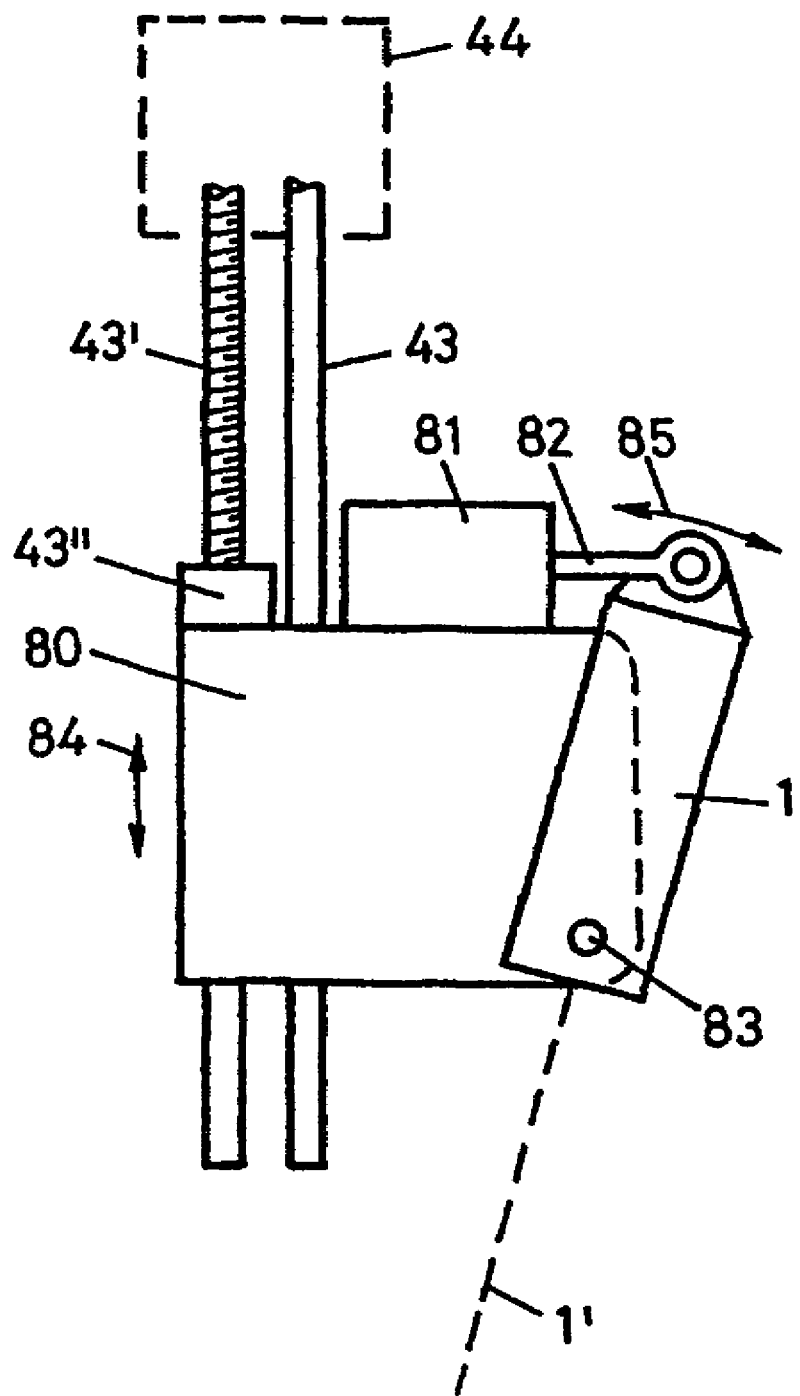
FIG. 6 shows schematically the suspension of an orientatable functional element.

For example, the arrangement as shown in FIG. 4a, with the element 1 arranged on its shaft 43 with provision for vertical adjustment and/or for tilting. FIG. 6 shows schematically the element 1 in the configuration of FIG. 4a, albeit not directly connected to the shaft 43 but arranged on an auxiliary holder 80 so as to be tiltable at a tilting point 83 (see double-headed arrow 85). Tilting drive is provided by a motor 81 via a pushrod 82. In addition to the shaft 43, a threaded spindle 43' is provided which runs in a mating part 43" of the auxiliary holder 80 and whose rotation causes a vertical shift of the auxiliary holder 80 as indicated by the double-headed arrow 84. Rotation of the auxiliary holder 80 can be effected, as before, by the motor 44, here indicated in broken lines.

Although this invention has been shown and described with respect to the detailed embodiments thereof, it will be understood by those of skill in the art that various changes may be made and equivalents may be substituted for elements thereof without departing from the scope of the invention. Therefore, it is intended that the invention not be limited to the particular embodiments disclosed in the above detailed description but that the invention will include all embodiments falling within the scope of the appended claims.

What is claimed is:

1. Apparatus for processing workpieces by relative displacement of a plurality of simultaneously operating functional elements in relation to the workpieces being worked on, with a device for the mounting of the functional elements, characterized in that the device has means for keeping the functional elements constantly in that operative position in relation to their workpiece section presently to be processed on the processing path by altering their position during a relative displacement with any desired change of direction, the means having a base with at least one holder for one or more functional units orientatably arranged thereon, the at least one holder including three holders of ring-shaped configuration, arranged one above the other with a common axis of symmetry, mounted on the base by externally located guide rollers, and each individually rotatable by an externally located drive, the functional elements being located in the inner region formed by the holders.

2. Apparatus according to claim 1, characterized in that the base is movably arranged on the apparatus for relative displacement in relation to the workpieces, transversely with respect to the longitudinal feed of the workpieces.

3. Apparatus according to claim 1, characterized in that the holders are linked directly or indirectly to the base at a common paint and have a common sweep axis.

4. Apparatus according to claim 1, wherein one holder is arranged on the base indirectly by being mounted on another holder in cascade fashion.

5. Apparatus according to claim 1 characterized in that the functional elements are arranged in the inner region of the structure, close to the axis of symmetry, and are mounted via a support on the holder.

6. Apparatus according to claim 1, characterized in that the functional elements are arranged orientatably on the holders and adjustably in distance from a workpiece bearing surface.

7. Apparatus according to claim 1, characterized in that the functional elements are arranged rotatably and/or tiltably on the holders.

8. Apparatus according to claim 1, characterized in that the functional elements are configured as one of a focusing head for an energy beam, as a sensor for image processing, or as a feed unit for filler material for the weld seam.

9. Apparatus according to claim 1, characterized in that two functional units are arranged on one holder.

10. Apparatus for processing workpieces by relative displacement of a plurality of simultaneously operating functional elements in relation to the workpieces being worked on, with a device for the mounting of the functional elements, the device having means for keeping the functional elements constantly in their operative position in relation to their workpiece section presently to be processed on the processing path by altering their position during a relative displacement with any desired change of direction, the means having a base with at least one holder for one or more functional units orientatably arranged thereon, the at least one holder including three holders of ring-shaped configuration, arranged one above the other with a common axis of symmetry, mounted on the base by externally located guide rollers, each individually rotatable by an externally located drive, the functional elements being located in the inner region formed by the holders, and one of the holders being mounted by a circular inner circumference on a circular outer circumference of another holder, so that the two holders have a common axis of rotation and are pivotable in relation to each other and also to the base.

11. Apparatus for processing workpieces by relative displacement of a plurality of simultaneously operating functional elements in relation to the workpieces being worked on, with a device for the mounting of the functional elements, the device having means for keeping the functional elements constantly in their operative position in relation to their workpiece section presently to be processed on the processing path by altering their position during a relative displacement with any desired change of direction, the means having a base with at least one holder for one or more functional units orientatably arranged thereon, the at least one holder including three holders of ring-shaped configuration, arranged one above the other with a common axis of symmetry, mounted on the base by externally located guide rollers, and each individually rotatable by an externally located drive, the functional elements being located in the inner region formed by the holders, and wherein the guide rollers lately engage a circular outer or inner circumference of the holders and are supported in their turn relative to the base, and are provided for the mounting of the holders on the base.

12. Apparatus according to claim 11, characterized in that the guide rollers are configured to run on the rim of the holders and whose contact regions guide the rim in radial and axial directions, in a formfitting manner.

13. Apparatus according to claim 12, characterized in that one of the guide rollers and the rim have meshing teeth.

14. Apparatus for processing workpieces by relative displacement of a plurality of simultaneously operating functional elements in relation to the workpieces being worked on, with a device for the mounting of the functional elements, the device having means for keeping the functional elements constantly in their operative position in relation to their workpiece section presently to be processed on the processing path by altering their position during a relative displacement with any desired change of direction, the means having a base with at least one holder for one or more functional units orientatably arranged thereon, the at least one holder including three holders of ring-shaped configuration, arranged one above the other with a common axis of symmetry, mounted on the base by externally located guide rollers, each individually rotatable by an externally located drive, the functional element being located in the inner region formed by the holders, and including a belt or toothed drive which is fixedly mounted in relation to the base, the drive being configured to act on an outer rim of the holder.

15. An apparatus for processing workpieces, comprising:
a plurality of functional elements;
a device for mounting the functional elements, the device including means for keeping the functional elements constantly in an operative position in relation to the workpieces being processed on a processing path—the means including
a base, with at least one holder for one or more functional units orientatably arranged thereon, the at least one holder including three holders of ring-shaped configuration, arranged one above the other with a common axis of symmetry, mounted on the base by externally located guide rollers, and each individually rotatable by an externally located drive, the functional elements being location the inner region formed by the holders.

16. The apparatus of claim 15, wherein the base is operable to move with respect to the apparatus in a direction that is substantially transverse to a longitudinal feed of the workpieces within the apparatus.

17. The apparatus of claim 15, wherein at least one holder is selectively rotatable in relation to the base.

18. The apparatus of claim 15, wherein the holders are linked to the base at a common point and have a common sweep axis.

19. Apparatus for processing workpieces by relative displacement of a plurality of simultaneously operating functional elements in relation to the workpieces being worked on, the apparatus comprising a device for mounting of the functional elements, characterized in that the device has means for keeping the functional elements constantly in their operative position in relation to the section of the processing path presently to be processed by altering the positions of the functional elements on the device relative to one another with any change of path direction during a relative displacement, the means including a base having at least one holder for supporting one or more functional elements orientatably arranged thereon, the at least one holder including three holders of ring-shaped configuration, arranged on above the other with a common axis of symmetry, mounted on the base by externally located guide rollers, and each individually rotatable by an externally located drive, the functional elements being located in the inner region formed by the holders.

20. The apparatus of claim 19, wherein one holder is mounted by a circular inner circumference on a circular outer circumference of another holder so that the holders have a common axis of rotation and are pivotable in relation to each other and to the base.

* * * * *

UNITED STATES PATENT AND TRADEMARK OFFICE
CERTIFICATE OF CORRECTION

PATENT NO. : 7,081,599 B2
APPLICATION NO. : 10/398975
DATED : July 25, 2006
INVENTOR(S) : Aebersold It is certified that error appears in the above-identified patent and that said Letters Patent is hereby corrected as shown below:

In Column 9, Claim 1, line 53, please delete the word "paint" and replace with --point--.

In Column 11, Claim 15, line 26, please delete the word "location" and replace with --located in--.

In Column 12, Claim 19, .line 20, please delete the word "on" and replace with --one--.

Signed and Sealed this

Fourteenth Day of November, 2006

JON W. DUDAS
*Director of the United States Patent and Trademark Office*